United States Patent
Funo et al.

(10) Patent No.: US 7,515,046 B2
(45) Date of Patent: Apr. 7, 2009

(54) WIRELESS RESPONSE DEVICE, IMAGE FORMING APPARATUS, AND EQUIPMENT

(75) Inventors: Hiroyuki Funo, Ashigarakami-gun (JP); Masao Watanabe, Ashigarakami-gun (JP); Kiyoshi Iida, Ashigarakami-gun (JP); Ryota Mizutani, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 142 days.

(21) Appl. No.: 11/347,635

(22) Filed: Feb. 6, 2006

(65) Prior Publication Data

US 2006/0273904 A1     Dec. 7, 2006

(30) Foreign Application Priority Data

Jun. 6, 2005    (JP)    ............................... 2005-166055
Dec. 20, 2005   (JP)    ............................... 2005-366834

(51) Int. Cl.
*G08B 13/14*    (2006.01)
*H04Q 5/22*     (2006.01)

(52) U.S. Cl. ................. 340/572.1; 340/10.4; 340/572.5
(58) Field of Classification Search ... 340/572.1–572.9; 235/375, 385; 438/22–25, 107, 108
See application file for complete search history.

(56) References Cited

U.S. PATENT DOCUMENTS

| 4,679,073 | A | * | 7/1987 | Hayashi ...................... 358/516 |
| 5,023,728 | A |   | 6/1991 | Nimura et al. |
| 5,966,008 | A |   | 10/1999 | Maier et al. |
| 6,084,503 | A |   | 7/2000 | Ruile et al. |
| 6,107,910 | A | * | 8/2000 | Nysen ........................ 340/10.1 |
| 7,154,395 | B2 | * | 12/2006 | Raskar et al. ............. 340/572.4 |
| 7,176,951 | B2 | * | 2/2007 | Asakura ..................... 347/139 |
| 7,190,270 | B2 | * | 3/2007 | Brown et al. ............. 340/572.1 |
| 7,248,165 | B2 | * | 7/2007 | Collins et al. ............ 340/572.1 |
| 7,256,695 | B2 | * | 8/2007 | Hamel et al. ............. 340/572.1 |
| 2001/0011794 | A1 |   | 8/2001 | Chihara |

(Continued)

FOREIGN PATENT DOCUMENTS

JP     A 2004-032052     1/2004

OTHER PUBLICATIONS

L. Reindl, et. al, Ultrasonics Symposium Proceedings, Institute of Electrical and Electronics Engineers (IEEE), SAW Devices as Wireless Passive Sensors, 1996, p. 363-367.
F. Schmidt, et. al, Ultrasonics Symposium Proceedings, Institute of Electrical and Electronics Engineers (IEEE), Remote Sensing of Physical Parameters By Means of Passive Surface Acoustic Wave Devices ("ID-Tags"), 1994, p. 589-592.
L. Reindl, et. al., Technische Universitat Clausthal, IEI, Wireless Passive SAW Identification Marks and Sensors, Jun. 2002, p. 1-115.

*Primary Examiner*—Toan N Pham
*Assistant Examiner*—Jennifer Mehmood
(74) *Attorney, Agent, or Firm*—Oliff & Berridge, PLC

(57) ABSTRACT

A wireless response device comprises an antenna that receives a question signal, an identification signal generating unit that generates a response signal for a question signal received by the antenna, and that operates passively, and an impedance conversion unit provided between the antenna and the identification signal generating unit, whose impedance changes in response to the state of the environment.

3 Claims, 5 Drawing Sheets

U.S. PATENT DOCUMENTS

| | | |
|---|---|---|
| 2004/0253009 A1 | 12/2004 | Kitamura |
| 2005/0207740 A1* | 9/2005 | Fukushima ................ 386/127 |
| 2006/0177233 A1* | 8/2006 | Ito et al. ..................... 399/50 |
| 2006/0214775 A1* | 9/2006 | Watanabe et al. ........ 340/10.41 |
| 2006/0214784 A1* | 9/2006 | Koshimizu et al. ....... 340/539.1 |
| 2006/0257040 A1* | 11/2006 | Shikii et al. ................ 382/254 |
| 2007/0013521 A1* | 1/2007 | Lindsay et al. ........... 340/572.1 |
| 2007/0063843 A1* | 3/2007 | Tsirline et al. ........... 340/572.1 |
| 2007/0090926 A1* | 4/2007 | Potyrailo et al. ......... 340/10.41 |
| 2007/0090927 A1* | 4/2007 | Potyrailo et al. ......... 340/10.41 |
| 2007/0118335 A1* | 5/2007 | Andarawis et al. .......... 702/188 |
| 2007/0222697 A1* | 9/2007 | Caimi et al. ................ 343/861 |

\* cited by examiner

WIRELESS RESPONSE DEVICE, IMAGE FORMING APPARATUS, AND EQUIPMENT

BACKGROUND OF THE INVENTION

1. Field of the Invention

The present invention relates to a wireless response device and an image forming apparatus and electronic equipment using the wireless response device.

2. Description of the Related Art

Status detection sensors for detecting equipment status are widely used in electronic equipment such as copiers and printers. As status detection sensors, for example, switches that detect status with an electrical short circuit or release, and photo interrupters that detect status by the interruption or transmission of light, are used. Status detection sensors are often used in applications that detect the binary status of whether or not a paper has passed, as in the case of a paper passage sensor, for example. In this case, the electronic equipment performs operating control and status monitoring of the electronic equipment according to the detection results of the paper passage sensor.

JP 2004-32052A discloses a wireless sensor (wireless response device) that detects the open/closed status in an opening/closing portion of a piece of equipment. This wireless sensor detects the open/closed status of the opening/closing portion by changing the state of electromagnetic waves of the equipment by placing the conductor in the vicinity of an antenna. Also, in Non-patent Document 1 (L. Reindl, et. al, Ultrasonics Symposium Proceedings, Institute of Electrical and Electronics Engineers (IEEE), SAW Devices as Wireless Passive Sensors, 1996, p. 363-367) and Non-patent Document 2 (F. Schmidt, et. al, Ultrasonics Symposium Proceedings, Institute of Electrical and Electronics Engineers (IEEE), Remote Sensing of Physical Parameters By Means of Passive Surface Acoustic Wave Devices ("ID-Tags"), 1994, p. 589-592), wireless sensors using a so-called SAW-ID (Surface Acoustic Wave Identification) are disclosed.

In status detection sensors such as switches and photo interrupters, power supply and the sending and receiving of signals are ordinarily performed by wire. When using a power line, there is the problem that power is also consumed when the equipment is in standby, or that malfunctions occur due to noise mixing in from the power line. Further, there is the problem that wiring becomes complicated when many status detection sensors are used in one piece of equipment, and many man-hours become necessary during fabrication or maintenance. Also, there is the problem that with connectors using the so-called lead-free materials of recent years, stable propagation of signals is hindered by the deterioration of those materials over time.

In order to address the problems described above, it is conceivable to wirelessly send and receive data signals to and from the status detection sensor. However, it is necessary for ordinary wireless communications equipment to have a battery inside in order to supply power. Thus, there is the problem that considerable labor is needed when exchanging batteries, so the realization of that concept is difficult. Also, as disclosed in JP 2004-32052A, in a system using RFID (Radio Frequency Identification), which does not require a battery, a communications blocking antenna for absorbing electromagnetic waves from an RFID reader is brought near or moved away from an RFID chip in order to not allow the RFID chip to operate. This system uses a principle in which the RDIF chip operates when the communications blocking antenna is moved away because electromagnetic waves reach the RFID chip, and the RDIF chip does not operate when the communications blocking antenna is brought near because electromagnetic waves are absorbed by the blocking antenna. However, in order to clearly change signals, a large space is necessary to bring the communications blocking antenna near and move it away. In this manner, the technology disclosed in JP 2004-32052A has the problem that it can not be used as a status detection sensor provided in a small space, such as a paper passage sensor, for example. Also, the wireless sensors disclosed in Non-patent Documents 1 and 2 have the problem that they have a configuration in which they have been specialized into a SAW device, which, in comparison to an RFID chip formed by a semiconductor (see FIG. 11 of Non-patent Document 1, and FIG. 6 of Non-patent Document 2), is disadvantageous for handling a large number of IDs. Further, when using a contact switch, as disclosed in Non-patent Document 2, there is the problem that depending on the arrangement of the SAW reflector, useless noise is generated because chattering occurs. Still further, when a sensor, which functions as a variable impedance, is arranged on a reflector disclosed in Non-patent Document 2, it is necessary to measure changes in amplitude of signals from the reflector. Therefore, a problem arises to apply the technology for a frequency band where an intensity of a signal is limited.

SUMMARY OF THE INVENTION

The present invention has been made in view of the above circumstances and provides a status detection sensor that can be used without performing complicated wiring. Also, the present invention provides a low noise status detection sensor that operates passively and does not require troublesome work such as battery exchange.

In order to address the problems described above, the present invention provides a wireless response device that includes an antenna that receives a question signal, an identification signal generating unit that operates powerlessly and generates a response signal to a question signal that has been received by the antenna, and an impedance conversion unit that is provided between the antenna and the identification signal generating unit and in which impedance is converted in response to the state of the environment.

This wireless response device wirelessly outputs a response signal that indicates the status of the environment. Because it is not necessary to construct a signal line when establishing the response apparatus, the man-hours when establishing and maintaining the response apparatus can be decreased.

BRIEF DESCRIPTION OF THE DRAWINGS

Embodiments of the present invention will be described in detail based on the following figures, wherein.

DETAILED DESCRIPTION OF THE INVENTION

Following is a description of embodiments of the present invention with reference to the drawings.

1. Basic Configuration

Figure 1:
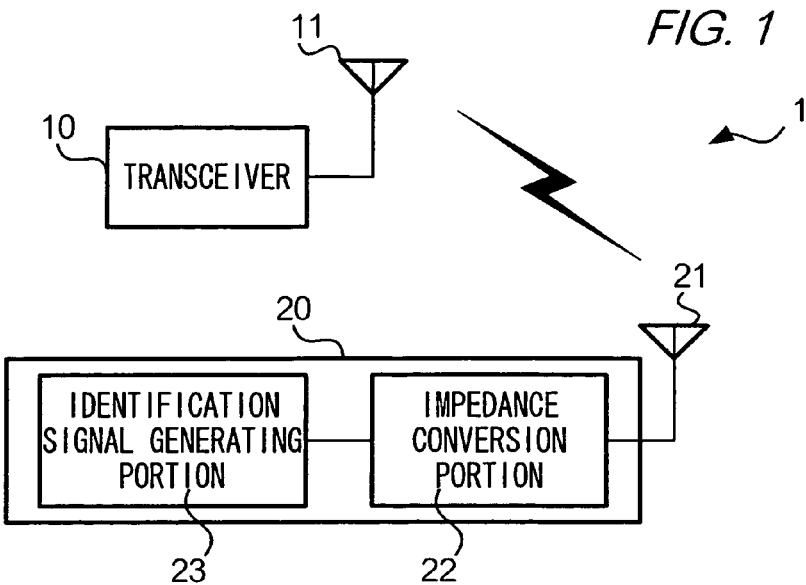
FIG. 1 is a block diagram that shows the functional configuration of a status detection system according to the present invention.

FIG. 1 is a block diagram that shows the functional configuration of a status detection system according to the present embodiment. The status detection system according to the present invention includes a transceiver 10 and a status detection sensor 20 that is a wireless response device. The transceiver 10 transmits a question signal to the status detection sensor 20 via an antenna 11. Also, the transceiver 10 receives a response signal transmitted from the status detection sensor 20 via the antenna 11. The status detection sensor 20 is a sensor that operates without power. In other words, the status detection sensor 20 is a passive sensor. An impedance conversion portion 22 converts changes in the state of the environment such as external force and light into changes in impedance. When the impedance of the impedance conversion portion 22 decreases due to the status of the environment, so that an antenna 21 and an identification signal generating portion 23 are in an impedance-matched state, the identification signal generating portion 23 generates a response signal in response to a question signal from the transceiver 10. The status detection sensor 20 outputs the response signal generated by the identification signal generating portion 23 via the antenna 21. On the other hand, when the impedance of the impedance conversion portion 22 increases due to the status of the environment, so that the antenna 21 and the identification signal generating portion 23 are in an impedance-unmatched state, the status detection sensor 20 does not transmit a response signal for the question signal from the transceiver 10. In this manner, the status detection sensor 20 outputs a response signal in response to the status of its environment.

2. First Embodiment

Figure 2:
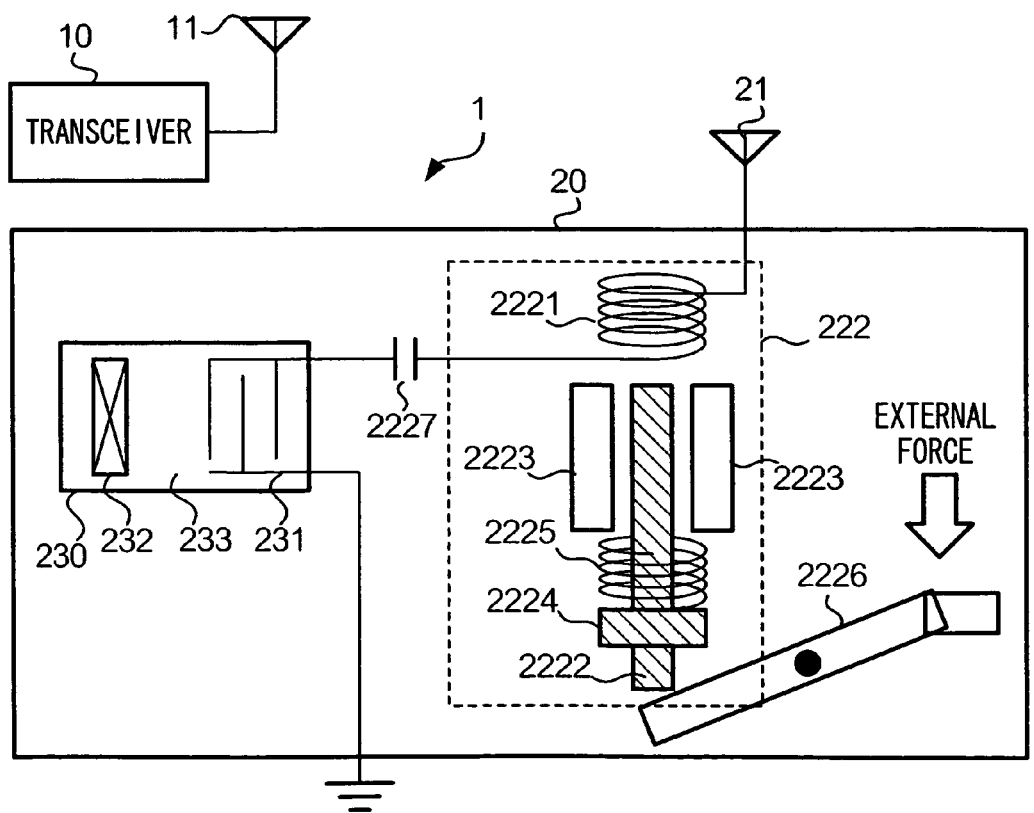
FIG. 2 shows a configuration of a status detection system 1 according to a first embodiment.

FIG. 2 shows a configuration of a status detection system 1 according to a first embodiment of the present invention. In the status detection system 1, a variable inductor 222 is used as the impedance conversion portion 22, and a SAW-ID tag 230 is used as the identification signal generating portion 23. The variable inductor 222 matches the impedance of the antenna 21 and the SAW-ID tag 230 when external force is applied (details given below). In a state in which external force is not applied, the antenna 21 and the SAW-ID tag 230 are impedance-matched. The SAW-ID tag 230 includes an IDT (Inter Digit Transducer, comb-shaped electrode) 231 for exciting surface acoustic waves, and a SAW reflector 232 that reflects surface acoustic waves. The IDT 231 and the SAW reflector 232 are formed on a piezoelectric substrate 233. In the present embodiment, the SAW-ID tag 230 is designed, for example, such that it responds to a signal with a frequency of 1 GHz.

As the material of the piezoelectric substrate 233, the materials mentioned below may be used, for example. (1) Oxides such as $SiO_2$, $SrTiO_3$, $BaTiO_3$, $BaZrO_3$, $LaAlO_3$, $ZrO_2$, $Y_2O38\%-ZrO_2$, $MgO$, $MgAl_2O_4$, $LiNbO_3$, $LiTaO_3$, $Al_2O_3$, or $ZnO$. (2) So-called $ABO_3$ perovskite materials such as $BaTiO_3$, $PbTiO_3$, $Pb_{1-x}La_x(Zr_yTi_{1-y})_{1-x/4}O_3$ (becoming so-called PZT, PLT, PLZT according to the values of x and y). (3) Tetragonal, rhombic, or quasi-cubic material, such as $KNbO_3$. (4) Ferroelectric material of a quasi-ilmenite structure, represented by $LiNbO_3$, $LiTaO_3$, or the like. (5) Tungsten bronze structure material such as $Sr_xBa_{1-x}Nb_2O_6$ and $Pb_xBa_{1-x}Nb_2O_6$. (6) Relaxer ferromagnetic material such as $Bi_4Ti_3O_{12}$, $Pb_2KNb_5O_{15}$, $K_3Li_2Nb_5O_{15}$, $Pb(Zn_{1/3}Nb_{2/3})O_3$, $Pb(Mg_{1/3}Nb_{2/3})O_3$, $Pb(Ni_{1/3}Nb_{2/3})O_3$, $Pb(In_{1/3}Nb_{2/3})O_3$, $Pb(Sc_{1/3}Nb_{2/3})O_3$, $Pb(Sc_{1/3}Na_{2/3})O_3$, and $Pb(Cd_{1/3}Nb_{2/3})O_3$. (7) High-polymer material such as polyvinylidene fluoride (PVDF). (8) Composite materials selected from substituted derivatives of the ferroelectric materials cited above.

Also, as the material of the IDT 231, it is possible to use a material in which an elemental metal such as Ti, Cr, Cu, W, Ni, Ta, Ga, In, Al, Pb, Pt, Au, and Ag, or an alloy such as Ti—Al, Al—Cu, Ti—N, Ni—Cr. The IDT 231 may have a single layer or a multi-layer structure of two or more layers. A layer includes a metal or an alloy. Au, Ti, W, Al, and Cu are particularly may be used as the materials for the IDT 231. Also, the film thickness of this metal layer may be not less than 1 nm and less than 10 μm.

In the variable inductor 222, inductance changes due to a ferromagnetic rod 2222 being inserted into an air core coil 2221. Guide rails 2223 are provided in the vicinity of the air core coil 2221. The guide rails 2223 are fixed to a casing (not shown in the figures) or the like. The guide rails 2223 are, for example, cylindrical members, whose inside diameter is larger than the outside diameter of the ferromagnetic rod 2222. The ferromagnetic rod 2222 is slidable within the guide rails 2223. A lever 2226 is provided in the vicinity of the ferromagnetic rod 2222. The ferromagnetic rod 2222 makes contact with the lever 2226 at a position corresponding to the point of action of the lever 2226. Due to external force being applied at a position corresponding to the point of force application of the lever 2226, the ferromagnetic rod 2222 moves along the guide rails 2223 and is inserted into the air core coil 2221. A spring 2225 is provided between the guide rails 2223 and a protruding portion 2224 of the ferromagnetic rod 2222. Due to the force of the spring 2225, in a state in which external force is not applied, the ferromagnetic rod 2222 is in an uninserted state positioned outside of the air core coil 2221.

The air core coil 2221 is a coil with, for example, a diameter of 2 mm, 1 coil turn, and a length of 1 mm. In this case, the self-inductance of the air core coil 2221 in the un-inserted state is approximately 4 nH. A capacitor 2227 is inserted in series between the antenna 21 and the SAW-ID tag 230 in order to obtain impedance-matching of the SAW-ID tag 230 and the antenna 21 in this state. For example, when using a 1 GHz signal, when a capacitor 2227 with a capacitance of 6.3 pF is used, a bandpass filter is formed with a center frequency of 1 GHz. That is, in a state in which the ferromagnetic rod 2222 is not inserted, impedance is matched for the SAW-ID tag 230 and the antenna 21.

On the other hand, when the ferromagnetic rod 2222 is inserted into the air core coil 2221 by external force being applied, the self-inductance of the air core coil 2221 changes. For example, when a ferromagnetic rod constituted by ferrite material with a permeability of 4000 H/m is inserted, the self-inductance of the air core coil 2221 becomes not less than 10 μH. Then, impedance matching of the antenna 21 and the SAW-ID tag 230 is disrupted. Specifically, at this time, an S-parameter $S_{21}$ of the bandpass filter configured by the coil and capacitor is not more than −50 dB. This means that almost none of the power of the question signal received by the antenna 21 reaches the SAW-ID tag 230. This also means that almost none of the response signal from the SAW-ID tag 230 reaches the antenna 21.

The transceiver 10 burst-outputs a question signal with a frequency of 1 GHz for the same number of cycles as the number of IDT pairs (in the example shown in FIG. 2, IDT is 1.5 pairs). The number of cycles may also be not the same number of cycles as the number of IDT pairs, such as the number of pairs +1. At this time, when external force is not applied to the lever 2226 and the SAW-ID tag 230 and the antenna 21 are impedance matched, the status detection sensor 20 outputs a response signal from the antenna 21. That is, the question signal received by the antenna 21 is supplied to the SAW-ID tag 230. A surface acoustic wave is excited in the IDT 231 by the supplied question signal. The excited surface acoustic wave propagates through the piezoelectric substrate 233 (in the piezoelectric substrate 233, the region in which the excited surface acoustic wave propagates is referred to as the "SAW waveguide"). The surface acoustic wave is reflected with the SAW reflector 232. The reflected surface acoustic wave is converted into an electrical signal by the IDT 231. The electrical signal is output from the antenna 21 as a response signal. Here, when the surface acoustic wave propagates through the piezoelectric substrate 233, a delay determined by the material and the propagation path length of the piezoelectric substrate 233 is generated. That is, the response signal has a particular delay time relative to the input signal. The delay time can be designed to be a predetermined value, by designing the layout of the SAW reflector 232 in the SAW-ID tag 230 (i.e., the length of the SAW waveguide), the material of the piezoelectric substrate. 233, and the like. In this manner, with the response signal delay time, it is possible to distinguish the SAW-ID tag 230 from another SAW-ID tag.

On the other hand, when the ferromagnetic rod 2222 is inserted into the air core coil 2221 due to external force being applied to the lever 2226, so that the antenna 21 and the SAW-ID tag become impedance un-matched, the question signal received by the antenna 21 is not supplied to the SAW-ID tag 230. Accordingly, the status detection sensor 20 does not output a response signal. In this manner, the response signal output by the status detection sensor 20 differs according to the presence or absence of external force. That is, the transceiver 10 can detect the presence or absence of external force for the status detection sensor 20 from the presence or absence of a response signal for the question signal.

The status detection system 1 may also include multiple status detection sensors 20 that each have a different delay time. In this case, from among the multiple status detection sensors 20, the transceiver 10 can, from the delay times of the response signals, specify a status detection sensor 20 to which external force has been applied.

With the status detection system 1 according to the present embodiment as described above, it is possible to wirelessly perform detection of external force. Also, the status detection sensor 20 operates passively. Accordingly, complicated wiring is not necessary to install the status detection sensor 20, so it is possible to decrease the number of man-hours for installation and maintenance. Also, the status detection sensor 20 can be installed in a location that would be difficult with wiring. Further, a connector that connects the sensor and a signal line is not necessary because the status detection sensor 20 outputs a signal wirelessly. Accordingly, it is possible to suppress the occurrence of poor operation due to a poor connector connection.

Also, by appropriately designing the permeability of the ferromagnetic rod 2222, the inductance of the air core coil 2221, and the insertion method of the ferromagnetic rod 2222 into the air core coil 2221, compatibility is possible with not only binary values ON/OFF, but with multilevel, variable quantities. When measuring a multilevel quantity, it is possible to measure the multilevel quantity according to the strength of the response signal received by the transceiver 10.

In the above description, an embodiment was described in which the ferromagnetic rod 2222 was inserted into the air core coil 2221 by external force being applied to the lever 2226, but the configuration of the variable inductor 222 is not limited to this. For example, a configuration is also possible wherein in a state in which external force is not applied, the ferromagnetic rod 2222 becomes inserted into the air core coil 2221 due to the force of a spring, and the ferromagnetic rod 2222 is withdrawn from the air core coil 2221 by the application of external force. Also, the value of the self-inductance of the air core coil 2221, the value of the permeability of the ferromagnetic rod 2222, the value of the capacitance of the capacitor 2227, and the value of the frequency of signals are given only by way of example, and are not limited to the values in this embodiment. Also, the method of transmitting external force to the ferromagnetic rod 2222 is not limited to using a lever. For example, a configuration is also possible in which external force is transmitted via an arm connected to the ferromagnetic rod 2222.

3. Second Embodiment

Figure 3:
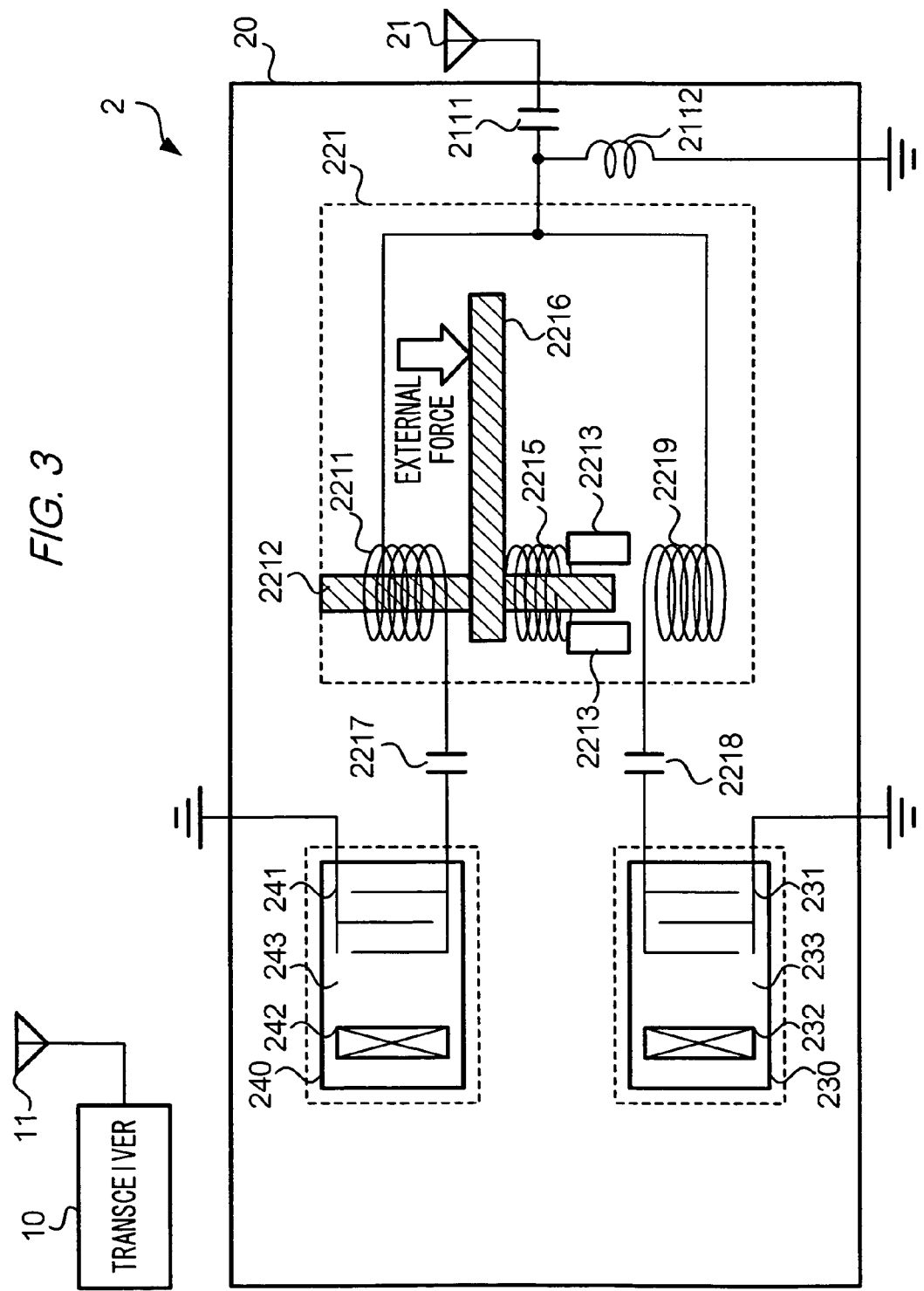
FIG. 3 shows a configuration of a status detection system 2 according to a second embodiment.

FIG. 3 shows a configuration of a status detection system 2 according to a second embodiment of the present invention. The status detection system 2 differs from the status detection system 1 according to the first embodiment in that the detection sensor 20 includes another SAW-ID tag 240 in addition to the SAW-ID tag 230. The SAW-ID tag 240 has basically the same structure as the SAW-ID tag 230, i.e., it includes an IDT 241, a SAW reflector 242, and a piezoelectric substrate 243. However, the SAW-ID tag 230 and the SAW-ID tag 240 are designed such that they have different delay times.

Also, in the status detection system 2, a variable inductor 221 is used in place of the variable inductor 222. The variable inductor 221 matches the impedance of the antenna 21 and the SAW-ID tag 230 when external force is not applied, and matches the impedance of the antenna 21 and the SAW-ID tag 240 when external force is applied. Details will be described below.

The variable inductor 221 includes an air core coil 2211, an air core coil 2219, and a ferromagnetic rod 2212. The inductance of the air core coils 2211 and 2219 changes due to the ferromagnetic rod 2212 being inserted inside those air core coils. Guide rails 2213 are provided between the air core coils 2211 and 2219. The guide rails 2213 are, for example, cylindrical members, whose inside diameter is larger than the outside diameter of the ferromagnetic rod 2212. The ferromagnetic rod 2212 is slidable within the guide rails 2213. An arm 2216 for transmitting external force to the ferromagnetic rod 2212 is connected to the ferromagnetic rod 2212. A spring 2215 is provided between the arm 2216 and the guide rails 2213. In a state in which external force is not applied to the arm 2216, the ferromagnetic rod 2212 is in a state in which it has been inserted into the air core coil 2211 by the force of the spring 2215. On the other hand, when external force is applied to the arm 2216, the ferromagnetic rod 2212 moves downward in FIG. 3, so that it is withdrawn from the air core coil 2211 and is inserted into the air core coil 2219. That is, in the variable inductor 221, in a state in which external force is not applied to the arm 2216, the ferromagnetic rod 2212 is inserted into the air core coil 2211, and when external force is applied to the arm 2216, the ferromagnetic rod is withdrawn from the air core coil 2211 and inserted into the air core coil 2219.

In the present embodiment, the air core coils 2211 and 2219 are coils that have a self-inductance of 4 nH when they are air cores in which the ferromagnetic rod 2212 is not inserted. The ferromagnetic rod 2212 is constituted by ferrite material with a permeability of 4000 H/m. When the ferromagnetic rod 2212 is inserted, the inductance of the air core coils 2211 and 2219 becomes 10 µH. The capacitors 2217 and 2218 have a capacitance of 6.3 pF. By using the air core coil 2211 and the capacitor 2217 having such parameters, a bandpass filter with a center frequency of 1 GHz is formed. When a 1 GHz signal is used, the antenna 21 and the SAW-ID tag 240 are impedance-matched when the air core coil 2211 is an air core. When the ferromagnetic rod 2212 is inserted into the air core coil 2211, the antenna 21 and the SAW-ID tag 240 become impedance-unmatched. This is also true for the air core coil 2219 and the capacitor 2218.

When the transceiver 10 transmits a question signal in a state in which external force is not applied to the arm 2216, the question signal received by the antenna 21 is supplied to the SAW-ID tag 230. The question signal is converted to a surface acoustic wave in the IDT 231. The surface acoustic wave is reflected by the SAW reflector 232, and converted to an electrical signal in the IDT 231. The converted electrical signal is output as a response signal from the antenna 21. This response signal is a signal that reflects the delay time of the SAW-ID tag 230. At this time, a response signal is not output from the SAW-ID tag 240.

On the other hand, when the transceiver 10 transmits a question signal in a state in which external force has been applied to the arm 2216, the question signal received by the antenna 21 is supplied to the SAW-ID tag 240. The SAW-ID tag 240 outputs a response signal. This response signal is a signal that reflects the delay time of the SAW-ID tag 240. At this time, a response signal is not output from the SAW-ID tag 230.

In the above manner, the transceiver 10 can detect the presence or absence of external force from the response signal from the status detection sensor 20. By providing multiple SAW-ID tags in this manner, both when external force is applied and when it is not applied, either of the response signals is detected. Accordingly, the status detection system 2 is suitable for status detection under a noise environment in which discrimination of a non-response status, in which there is no response signal, is difficult.

The number of SAW-ID tags included in the status detection system 2 is not limited to two; a configuration is also possible in which the status detection system 2 has three or more SAW-ID tags. Also, these SAW-ID tags may be incorporated in a single chip. That is, multiple IDTs and SAW reflectors may be formed on a single piezoelectric substrate. By using SAW-ID tags incorporated in a single chip in this manner, it is possible to increase the efficiency of the manufacturing and assembly process.

4. Third Embodiment

Figure 4:
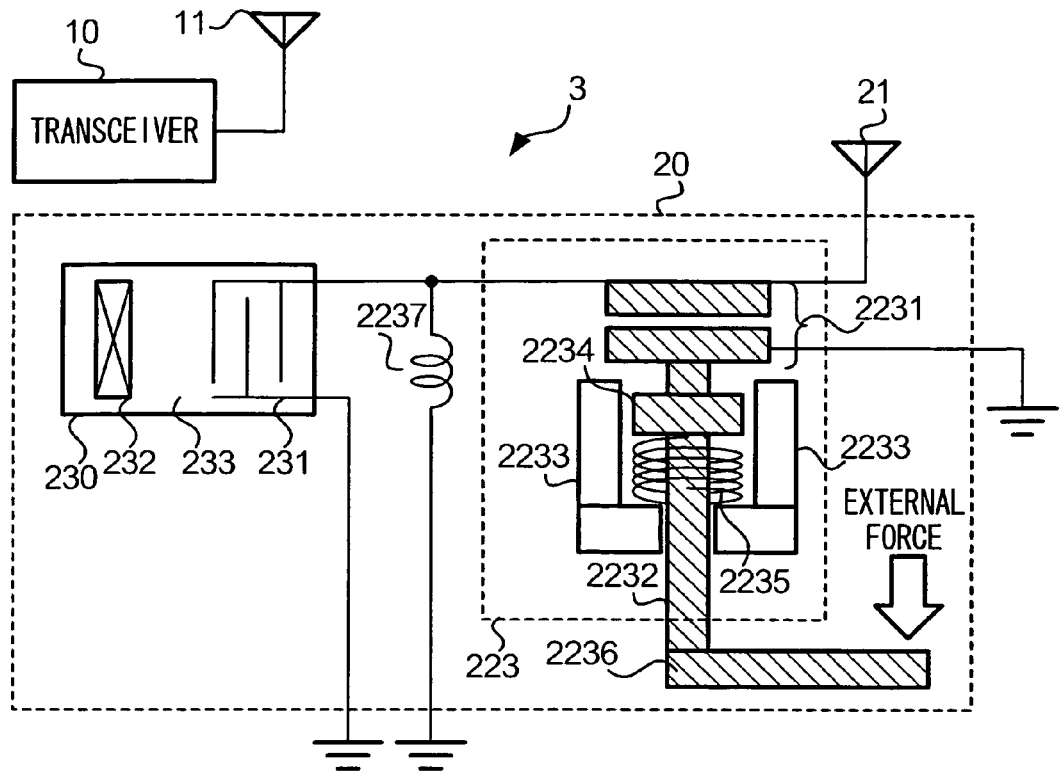
FIG. 4 shows a configuration of a status detection system 3 according to a third embodiment.

FIG. 4 shows a configuration of a status detection system 3 according to a third embodiment of the present invention. The status detection system 3 differs from the status detection system 1 according to the first embodiment in that the status detection system 3 uses a variable capacitor 223 instead of the variable inductor 222. The variable capacitor 223 includes parallel plates 2231, a core rod 2232 connected to one plate of the parallel plates 2231, and an arm 2236 for transmitting external force to the core rod 2232. Guide rails 2233 are provided along the core rod 2232 in the vicinity of the parallel plates 2231. The guide rails 2233 are fixed to a casing or the like (not shown in the figures). The guide rails 2233 are, for example, cylindrical members, whose inside diameter is larger than the outside diameter of the core rod 2232. The core rod 2232 is slidable within the guide rails 2233. A spring 2235 is provided between the guide rails 2233 and a protruding portion 2234 of the core rod 2232. Due to the force of the spring 2235, the distance between the parallel plates 2231 is the least in a state in which external force is not applied.

In order to match the impedance of the antenna 21 and the SAW-ID tag 230, an inductor 2237 is inserted in parallel with the capacitor. One end of the inductor 2237 is grounded. Also, of the parallel plates 2231, the plate that is connected to the core rod 2233 is grounded.

The parallel plates 2231, for example, have a capacitance of 5 nF in a state in which the distance between the plates is the least (referred to as the "near state"), and a capacitance of 0.1 pF in a state in which the distance between the plates is the most (referred to as the "separated state"). Also, the inductor 2237 is a coil that has an inductance of 2 µH (micro Henry). When using a 1 GHz signal, the signal level from the antenna 21 to the SAW-ID tag 230 in the near state is below −50 dB. Thus, with the parallel plates 2231 in the near state (a state in which external force is not applied), the signal from the antenna 21 is not supplied to the SAW-ID tag 230. In this state, even if a question signal is transmitted from the transceiver 10, the SAW-ID tag 230 does not output a response signal for the question signal.

On the other hand, when the parallel plates 2231 are in the separated state due to external force being applied, more than 99% of the signal from the antenna 21 is transmitted to the SAW-ID tag 230. When a question signal from the transceiver 10 in this state, the SAW-ID tag 230 outputs a response signal for the question signal.

With the status detection system 3 according to the present embodiment as described above, it is possible to wirelessly perform detection of external force. Also, by suitably designing the capacitance of the parallel plates 2231 and the method of separating/drawing close the parallel plates, it is possible to make the system compatible with not only binary values ON/OFF, but also with multilevel, variable quantities.

In the description above, an embodiment was described in which the parallel plates 2231 are separated by external force being applied to the arm 2236, but the configuration of the variable capacitor 223 is not limited to this. For example, a configuration is possible in which, in a state in which external force is not applied, the parallel plates 2231 are in the separated state due to the force of the spring, and the parallel plates 2231 are placed in the near state by external force being applied. Also, the capacitance value of the parallel plates 2231, the value of the inductance of the inductor 2237, and the value of the signal frequency are given only as examples, and are not limited to these values.

5. Fourth Embodiment

Figure 5:
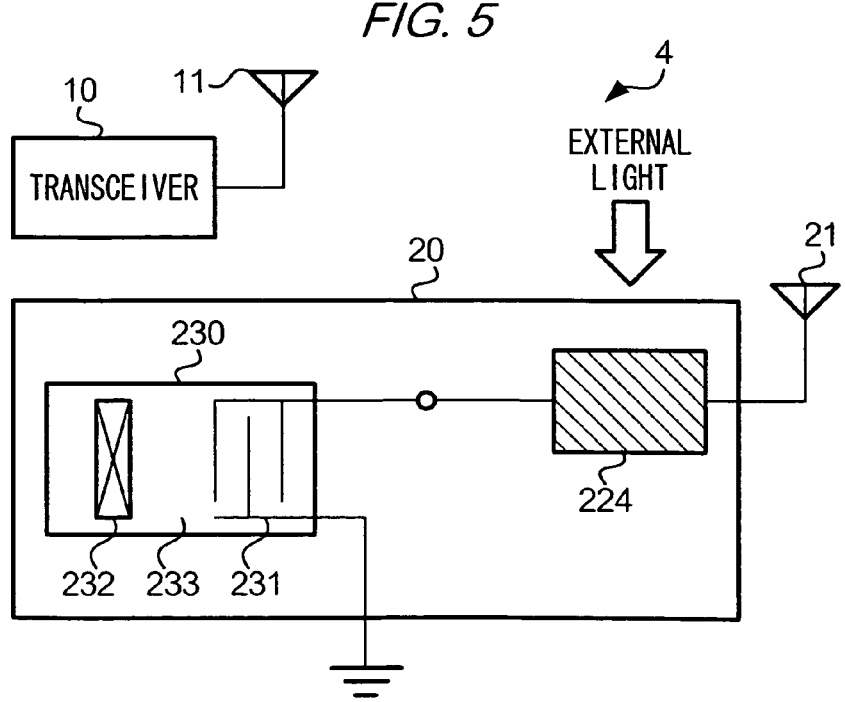
FIG. 5 shows a configuration of a status detection system 4 according to a fourth embodiment.

FIG. 5 shows a configuration of a status detection system 4 according to a fourth embodiment of the present invention. The status detection system 4 differs from the status detection system 1 according to the first embodiment in that a photoconductive cell 224 is used in place of the variable inductor 222. The photoconductive cell 224 includes a compound semiconductor of CdS, CdSe, Pbs, InSb, or the like. The photoconductive cell 224 is a device whose conductivity increases when light is incident. That is, the transmission path between the antenna 21 and the SAW-ID tag 230 conducts when light is incident. Thus, the signal from the antenna 21 is transmitted to the SAW-ID tag 230. When a question signal from the transceiver 10 is transmitted in this state, the SAW-ID tag 230 outputs a response signal for the question signal.

On the other hand, when light is not incident, the transmission path between the antenna 21 and the SAW-ID tag 230 is opened. In this case, the signal from the antenna 21 is not transmitted to the SAW-ID tag 230. In this state the SAW-ID tag 230 does not output a response signal for the question signal even if a question signal is transmitted from the transceiver 10.

With the status detection system 4 according to the present embodiment as described above, it is possible to wirelessly perform detection of external force. Also, by appropriately designing the resistance value of the photoconductive cell 224, compatibility is possible with not only binary values ON/OFF, but also with multilevel, variable quantities. When, for example, the resistance value of the photoconductive cell 224 is high, a peripheral circuit such as an amplifier may be used as necessary.

In the present embodiment, it is described in which a variable resistor is used as an impedance conversion unit in which the resistance value of the impedance conversion unit changes with external light, particularly a mode in which a photoelectric cell is used as a variable resistor, but it is also possible to use a variable resistor other than a photoelectric cell. For example, a potentiometer in which the resistance value changes due to external force may also be used as a variable resistor. Alternatively, a device may also be used in which electricity is generated by light or external force, such as a solar battery or piezoelectric element.

6. Fifth Embodiment

Figure 6:
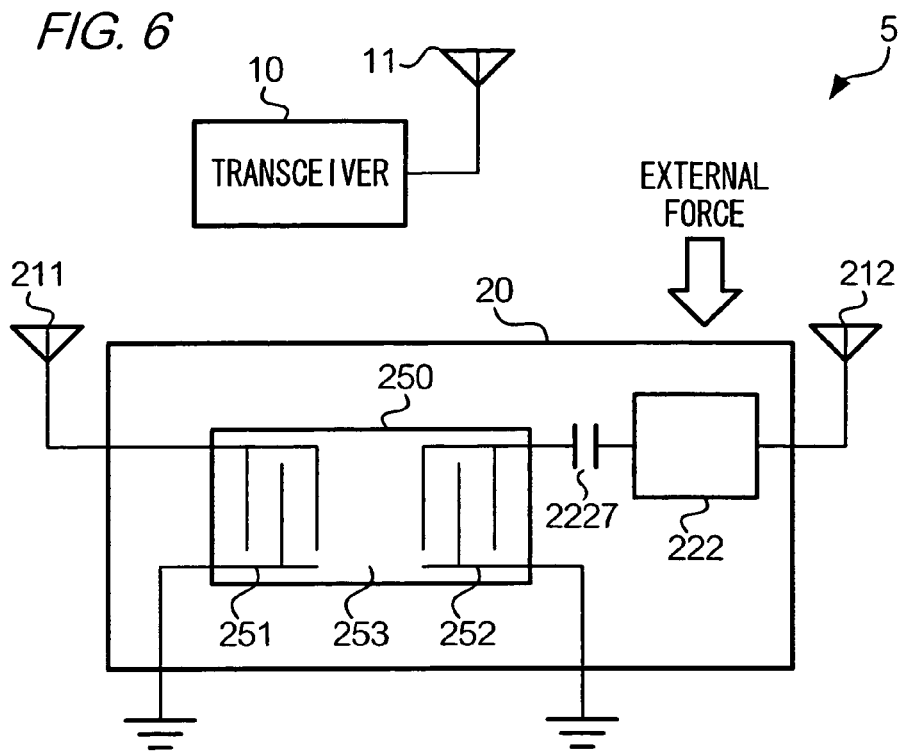
FIG. 6 shows a configuration of a status detection system 5 according to a fifth embodiment.

FIG. 6 shows a configuration of a status detection system 5 according to a fifth embodiment of the present invention. FIG. 7 shows signals used by the status detection system 5. The status detection system 5 differs from the status detection system 1 according to the first embodiment in that a SAW-ID tag 250 is used instead of the SAW-ID tag 230. The SAW-ID tag 250 includes two IDTs, an IDT 251 and an IDT 252. The IDT 251 and the IDT 252 are respectively connected to different antennas 211 and 212. In the present embodiment, each of the antennas 211 and 212 receives a question signal and transmits a response signal. A variable inductor 222 is connected in series between the IDT 252 and the antenna 212. The variable inductor 222 is an impedance conversion unit that matches the impedance of the IDT 252 and the antenna 212 when external force is applied, and unmatches the impedance of the IDT 252 and the antenna 212 when external force is not applied. A variable inductor is not provided between the antenna 211 and the IDT 251. The detailed configuration of the variable inductor 222 is omitted from FIG. 6 because the figure would become complicated, but the configuration of the variable inductor 222 is the same as shown in FIG. 2.

When external force is not applied to the variable inductor 222, the operation of the status detection sensor 20 is as follows. When a question signal is received from the transceiver 10, a surface acoustic wave is excited in the IDT 251 by the question signal received with the antenna 212. The excited surface acoustic wave propagates through a piezoelectric substrate 253. The excited surface acoustic wave that has propagated through the piezoelectric substrate 253 is reflected in the IDT 252, and arrives at the IDT 251. The surface acoustic wave is converted to an electric signal in the IDT 251, and output as a response signal $S_2$ via the antenna 211 (FIG. 7B).

Figure 7A:
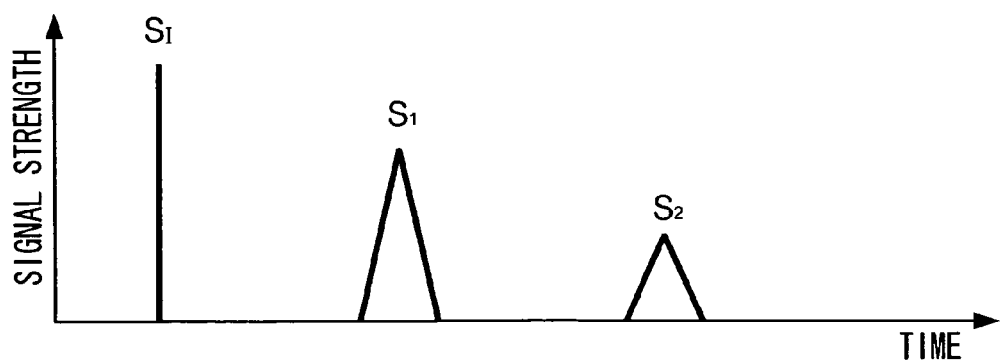
FIGS. 7A and 7B show signals used by the status detection system 5.
Figure 7B:
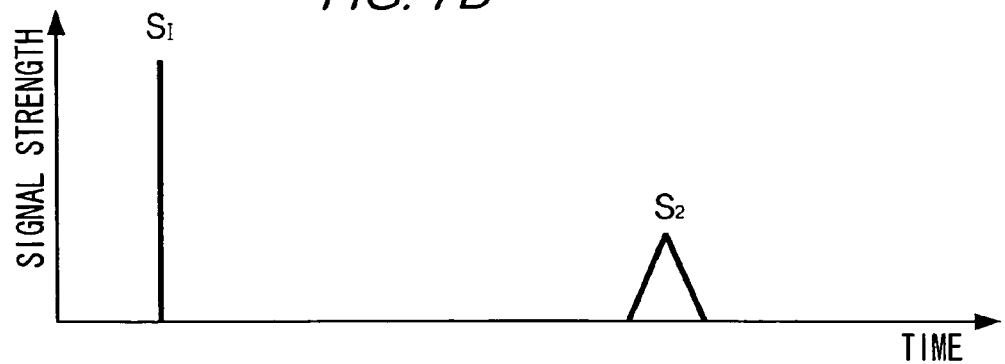

FIG. 7B shows response signals output from the status detection sensor in a state in which external force is not applied to the variable inductor 222. As shown in FIG. 7B, at this time, because the surface acoustic wave propagates in a round-trip through the piezoelectric substrate 253, the response signal $S_2$ for the question signal $S_I$ has a delay time corresponding to double the length (SAW waveguide) of the piezoelectric substrate 253.

When external force is applied to the variable inductor 222, the operation of the status detection sensor 20 is as follows. When a question signal is received from the transceiver 10, a surface acoustic wave is excited in the IDT 251 by the question signal received with the antenna 211. The excited surface acoustic wave propagates through the piezoelectric substrate 253. The excited surface acoustic wave that has propagated through the piezoelectric substrate 253 is converted into an electric signal in the IDT 252, and output as a response signal $S_1$ via the antenna 212. The response signal S1 has a delay time corresponding to one time the length (SAW waveguide) of the piezoelectric substrate 253 (see FIG. 7). Also, because part of the surface acoustic wave is reflected in the IDT 252, same as in the case in which external force is not applied to the variable inductor 222, a response signal $S_2$ is also output from the antenna 211 (FIG. 7A). FIG. 7A shows response signals output from the status detection sensor in a state in which external force is applied to the variable inductor 222. At this time, in addition to the response signal $S_2$ that corresponds to the surface acoustic wave that propagates in a round-rip through the SAW waveguide, the response signal $S_1$ that corresponds to the surface acoustic wave that crosses (one-way) the SAW waveguide is also output. The response signal $S_1$ has a delay time that corresponds to one time the SAW waveguide.

The above description is for a question signal received by the antenna 211, but likewise for a question signal received by the antenna 212, the response signal $S_1$ is output from the antenna 211, and the response signal $S_2$ is output from the antenna 212. Accordingly, only the response signal $S_2$ is output in a state in which external force is not applied to the variable inductor 222, and in a state in which external force has been applied to the variable inductor 222, the response signal $S_1$ is also output in addition to the response signal $S_2$.

With the status detection system 5 according to the present embodiment as described above, it is possible to wirelessly perform detection of external force. Also, in the status detection system 5, regardless of the external force that is applied to the variable inductor 222, the response signal $S_2$ is always output. Accordingly, in addition to status detection of whether or not there is external force, status detection of the sensor such as sensor breakdown, and detection of temperature from changes in the delay time, are possible. Also, in the present embodiment, another impedance conversion element may be used in place of the variable inductor 222, such as a variable capacitor or variable resistor.

7. Sixth Embodiment

Figure 8:
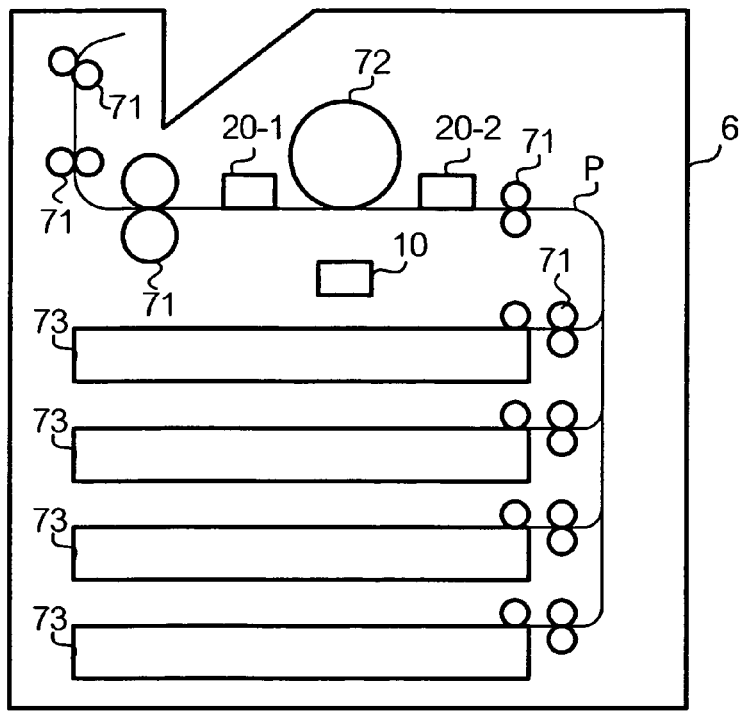
FIG. 8 shows a configuration of an image forming apparatus 6 according to a sixth embodiment.

FIG. 8 shows a configuration of an image forming apparatus 6 according to a sixth embodiment of the present invention. The image forming apparatus 6 is an image forming apparatus, such as, for example, a printer or a copier. In FIG. 8, only the elements necessary for the following description are shown, such as transport rollers 71 for transporting paper, a transfer roller 72 for performing image formation on the paper, and a paper tray 73 for accumulating paper. The image forming apparatus 6 includes a transceiver 10 and multiple status detection sensors 20 (in the example shown, two status detection sensors 20-1 and 20-2). The status detection sensors 20 are any of the sensors described above in the first through fifth embodiments. The multiple status detection sensors 20 are designed such that they each have different IDs (different delay times), and can be distinguished from one another. The multiple status detection sensors 20 are provided along a paper (print media) transport path P. For example, when using sensors that detect the presence or absence of external force as described in the first through third embodiments and the fifth embodiment, a configuration is possible in which a lever is provided on the transport path P, and when paper has passed, external force is applied to the status detection sensors 20. Alternatively, when using sensors that detect the presence or absence of light as described in the fourth embodiment, a configuration is possible in which a light source is provided in the transport path P, and when paper has passed, light from the light source is blocked. In the present embodiment, the status detection sensors 20 are configured such that a response signal is output when paper has passed the vicinity of the status detection sensors 20.

When a response signal for a question signal is received, the transceiver 10 outputs the received response signal to a CPU (Central Processing Unit, not shown in FIG. 8) of the image forming apparatus 6. The CPU extracts an ID of the status detection sensors 20 from the output signal by a method such as calculating the delay time of the response signal. The CPU judges which part the paper has passed based on the extracted ID. When the paper has not passed, the status detection sensors 20 do not output a response signal.

Figure 9:
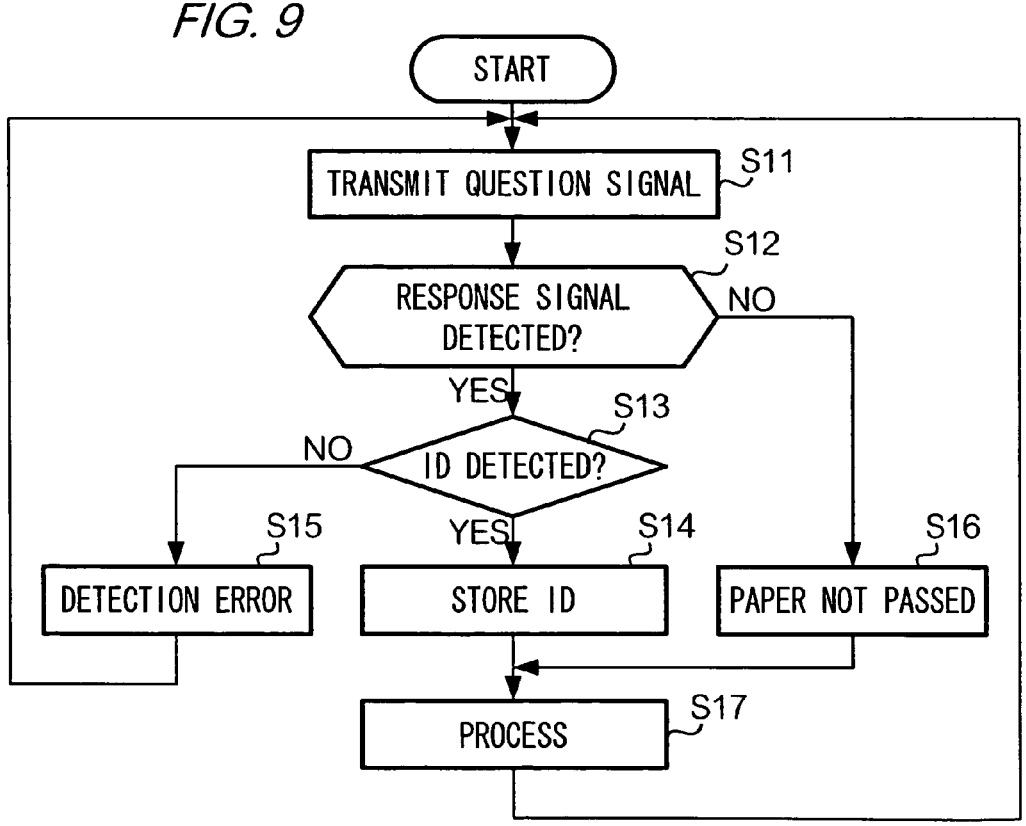
FIG. 9 is a flowchart that shows the operation of the image forming apparatus 6.

FIG. 9 is a flowchart that shows the operation of the image forming apparatus 6. The CPU causes a response signal to be output by controlling the transceiver 10 (Step S11). When a response signal is detected for the response signal (Step S12: YES), the CPU extracts an ID from the detected response signal (Step S13). When an ID has been successfully extracted (Step S13: YES), the CPU creates a list of extracted IDs, and stores it in a storage portion (Step S14). When ID extraction has failed (Step S13: NO), the CPU judges that an ID detection error has occurred (Step S15), and causes a response signal to be output again by controlling the transceiver 10 (Step S11). When a response signal is not detected for the response signal (Step S12: NO), the CPU judges that the paper has not passed (Step S16). In the above manner, when detecting the passage or non-passage of paper, the CPU performs processing according to that situation (Step S17). The above processing is repeatedly executed as necessary.

The transceiver 10 may also include a single antenna, or the transceiver 10 may include multiple antennas if necessary in order to send and receive signals. Also, in order to prevent leakage of electromagnetic waves outside of the image forming apparatus 6, the casing of the image forming apparatus 6 may be covered with a conductive material. Further, in order to insure EMC (Electromagnetic Compatibility) with other electronic components inside the image forming apparatus 6, the status detection system may be electromagnetically shielded from other electronic components.

The status detection sensor according to the present invention can be used in applications other than the paper passage sensors shown in FIG. 8. For example, the status detection sensor according to the present invention can also be used for status detection of movable portions such as a sorter or door opening/closing portion. In this case, according to the mobile state of the movable portion, the status detection sensor is provided in a position where external force (or light) applied to the status detection sensor changes. For example, the status detection sensor may be provided in a position where light is not irradiated when a door is closed, and light is irradiated when the door is opened. Thus, it is possible to detect the opened/closed state of the door. Alternatively, a potentiometer may be provided to change its resistance in response to opening/closing a door. Thus, the system can detect the state of the door, in other words, the system can detect whether the door is opened or closed. Yet alternatively, a sensor, whose impedance changes in response to status of the environment. The states of the environment includes, for example, temperature, force, electric field, or magnetic field. A thermostat or a thermistor may be used as a device that senses a change in temperature. A strain gage or a piezoelectric device may be used as a device that senses a change in force. Electrostatic capacity may be used to sense a change in electric field. Inductance may be used to sense a change in magnetic field Alternatively, the status detection sensor described in the above embodiments can be used to measure the amount of paper remaining in a paper tray. That is, the status detection sensor is provided in a position where external force is applied to the status detection sensor according to the amount of paper accumulated in the paper tray. For example, it is possible to use the status detection system 1, configured such that the ferromagnetic rod 2222 is inserted into the air core coil 2221 by the weight of the paper accumulated in the paper tray. In this case, because the amount that the ferromagnetic rod 2222 is inserted into the air core coil 2221, i.e., the amount of change in impedance, varies depending on the weight of the paper (=the number of sheets of paper) accumulated in the paper tray, the strength of the response signal therefore varies. That is, with this configuration, it is possible to measure the amount of paper remaining from the strength of the response signal. The configuration of the gauge of paper remaining in the paper tray is not limited to this; configurations of various modes are possible, such as a configuration in which external force is applied to the status detection sensor according to the paper thickness.

Because a system using the status detection sensor 20 as described above does not require a signal line to be laid, the sensor can be provided in small spaces where it is difficult to lay a signal line. Also, in an environment with strong noise, such as near a motor, it is possible to reduce detection errors more than in the case of a wired connection by appropriately selecting the signal frequency that will be used.

8. Further Embodiments

The present invention is not limited to the embodiments described above; various modified embodiments are possible.

In the above embodiments, modes using a SAW-ID tag as an identification signal generating unit are described, but the identification signal generating unit is not limited to a SAW-ID tag. For example, an RF-ID tag, delay line, or the like may be used.

Also, in the above embodiments, modes using a variable inductor, variable capacitor, variable resistor, and power generator respectively alone as an impedance conversion unit are described, but an impedance conversion unit may also be configured by combining these. For example, in the status detection system 1 shown in FIG. 2, a variable capacitor may be used in place of the capacitor 2227.

Also, in the above sixth embodiment, modes were described in which identification of multiple SAW-ID tags from signal delay times was performed, but ID identification is not limited to a configuration using delay times. A configuration is also possible in which the parameters of capacitors and inductors are appropriately designed so that ID identification is performed with the frequency of signals that respond.

Also, in the above embodiments, the transceiver 10 is provided with both a function to send a question signal and a function to receive a response signal, but the question signal transmitter and the response signal receiver may each be configured as separate apparatuses.

Also, in the sixth embodiment, an image forming apparatus using the status detection sensor according to the present invention is described, but the status detection sensor according to the present invention may be used in electronic equipment other than an image forming apparatus, or in mechanical equipment. The electronic equipment may be controlled on the basis of the output of a status detection sensor in accordance with the present invention. For the mechanical equipment, a user or an apparatus can monitor the status of the mechanical equipment at a remote location. Furthermore, an electronic equipment can perform feedback control of the mechanical equipment on the basis of the output of the status detection sensor.

As described above, the present invention provides a wireless response device that includes an antenna that receives a question signal, an identification signal generating unit that operates powerlessly and generates a response signal to a question signal that has been received by the antenna, and an impedance conversion unit that is provided between the antenna and the identification signal generating unit and in which impedance is converted in response to the state of the environment.

This wireless response device wirelessly outputs a response signal that indicates the status of the environment. Because it is not necessary to construct a signal line when establishing the response apparatus, the man-hours when establishing and maintaining the response apparatus can be decreased.

In one embodiment, in this wireless response device, the impedance conversion unit may include any one of a variable capacitor with which the capacity of the wireless response device changes according to external force, a variable inductor with which the inductance of the wireless response device changes according to external force, and a variable resistor with which the resistance of the wireless response device changes according to external force or light irradiation.

According to this wireless response device, it is possible to wirelessly detect a change in external force or light irradiation.

In another embodiment, this wireless response device may output a multi-level signal in response to the amount of the change in impedance in the impedance conversion unit.

According to this wireless response device, a response signal is output as a multilevel signal. Thus, it is possible to obtain more detailed information related to the installed location of the response apparatus.

Yet in another embodiment, in these wireless response devices, the identification signal generating apparatus may include any of an RF-ID tag, delay line, and SAW-ID tag.

Also, the present invention provides an image forming apparatus that includes an image forming unit that forms an image on a recording material, a recording material accumulating unit that accumulates the recording material, a transport unit that transports the recording material along a transport path from the recording material accumulating unit to the image forming unit, any of the above wireless response devices, provided along the transport path in a position where, due to the recording material passing the vicinity of that wireless response device, the external force applied to that wireless response device changes, or the strength of light incident on that response apparatus changes, and a transceiving unit that transmits and receives signals to and from the wireless response device.

This image forming apparatus can decrease the costs of production and maintenance, because passage of the recording material is detected with the wireless response device. Also, it is possible to install the response apparatus even in a location with little space where a wired installation would be impossible.

Also, the present invention provides an image forming apparatus that includes an image forming unit that forms an image on a recording material, a recording material accumulating unit that accumulates the recording material, a transport unit that transports the recording material along a transport path from the recording material accumulating unit to the image forming unit, any of the above wireless response devices, provided in the recording material accumulating unit in a position where, according to the amount of the recording material accumulated in the recording material accumulating unit, the external force applied to that wireless response device changes, or the strength of light incident on that response apparatus changes, and a transceiving unit that transmits and receives signals to and from the wireless response device.

This image forming apparatus can decrease the costs of production and maintenance, because passage of the recording material is detected with the wireless response device. Also, it is possible to install the response apparatus even in a location with little space where a wired installation would be impossible.

Also, the present invention provides electronic equipment including a movable portion, any of the above wireless response devices, provided in a position where, according to the mobile state of the movable portion, the external force applied to that wireless response device changes, or the strength of light incident on that response apparatus changes, and a transceiving unit that transmits and receives signals to and from the wireless response device.

This electronic equipment can decrease the costs of production and maintenance, because passage of the recording material is detected with the wireless response device. Also, it is possible to install the response apparatus even in a location with little space where a wired installation would be impossible.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosures of Japanese Patent Applications No. 2005-166055 filed on Jun. 15, 2005, and No. 2005-366834 filed on Dec. 20, 2005, including specification, claims, drawings and abstract are incorporated herein by reference in its entirety.

What is claimed is:

1. An image forming apparatus, comprising:
   an image forming unit that forms an image on a recording material;
   a recording material accumulating unit that accumulates the recording material;

a transport unit that transports the recording material along a transport path from the recording material accumulating unit to the image forming unit;

a wireless response device, wherein the wireless response device is provided along the transport path, and is provided in a position where, due to the recording material passing the vicinity of the wireless response device, the external force applied to that wireless response device changes, or the strength of light incident on the wireless response device changes; and a transceiving unit that transmits and receives signals to and from the wireless response device, wherein the wireless response device includes:

an antenna that receives a question signal;

an identification signal generating unit that generates a response signal for a question signal received by the antenna, and that operates passively; and an impedance conversion unit provided between the antenna and the identification signal generating unit, whose impedance changes in response to the state of the environment.

2. An image forming apparatus, comprising:

an image forming unit that forms an image on a recording material;

a recording material accumulating unit that accumulates the recording material;

a transport unit that transports the recording material along a transport path from the recording material accumulating unit to the image forming unit;

a wireless response device, wherein the wireless response device is provided in the recording material accumulating unit in a position where, according to the amount of the recording material accumulated in the recording material accumulating unit, the external force applied to the wireless response device changes, or the strength of light incident on the wireless response device changes; and a transceiving unit that transmits and receives signals to and from the wireless response device, wherein the wireless response device includes:

an antenna that receives a question signal;

an identification signal generating unit that generates a response signal for a question signal received by the antenna, and that operates passively; and an impedance conversion unit provided between the antenna and the identification signal generating unit, whose impedance changes in response to the state of the environment.

3. Equipment, comprising:

a movable portion;

a wireless response device, wherein the wireless response device is provided in a position where, according to a mobile state of the movable portion, the external force applied to the wireless response device changes, or the strength of light incident on the wireless response device changes; and a transceiving unit that transmits and receives signals to and from the wireless response device, wherein the wireless response device includes:

an antenna that receives a question signal;

an identification signal generating unit that generates a response signal for a question signal received by the antenna, and that operates passively; and an impedance conversion unit provided between the antenna and the identification signal generating unit, whose impedance changes in response to the state of the environment.

* * * * *